Sept. 16, 1958  H. S. McCREARY, JR  2,852,694
IONIZATION CHAMBER

Filed March 17, 1953  3 Sheets-Sheet 1

INVENTOR
Henry S. McCreary, Jr.
BY
ATTORNEY

Sept. 16, 1958  H. S. McCREARY, JR  2,852,694
IONIZATION CHAMBER

Filed March 17, 1953  3 Sheets-Sheet 3

INVENTOR
Henry S. McCreary, Jr
BY
ATTORNEY

United States Patent Office 2,852,694
Patented Sept. 16, 1958

2,852,694
IONIZATION CHAMBER

Henry S. McCreary, Jr., Pittsburgh, Pa., assignor to Westinghouse Electric Corporation, East Pittsburgh, Pa., a corporation of Pennsylvania Application March 17, 1953, Serial No. 342,861

16 Claims. (Cl. 250—83.1)

My invention relates to radiation detectors and, more particularly, to a detector which includes an electrically adjusted compensated ion chamber so as to be sensitive to neutron flux and relatively insensitive to gamma rays.

In accordance with the prior art of which I am aware, ion chambers have been built comprising a pair of spaced electrodes arranged so as to provide a substantial volume between the two. In the region between the two electrodes, there is placed a gas which may be ionized by certain types of radiation. A high potential difference is applied between the two electrodes, thus producing an electric field of appreciable strength between the electrodes. When certain types of radiation, such as beta or gamma radiation, enter the gas-filled chamber, they cause ionization of the gas. The ionized particles produced are swept from the gas volume by the electric field and are collected by the electrodes, thus creating an electric current between the electrodes which is proportional to the radiation intensity. The intensity of the radiation entering the chamber may, therefore, be determined by measuring the current through the chamber.

Since neutrons do not produce ionization directly, a neutron sensitive ionization chamber can be obtained by introducing a material with which neutrons interact to produce ionizing particles. For example, the electrodes may be coated with boron. In accordance with this invention, the isotope $B^{10}$ is preferred as it has a high thermal neutron cross section for the following reaction:

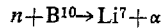

$$n + B^{10} \rightarrow Li^7 + \alpha$$

One of the product particles is ejected into the gas volume of the chamber and produces ionization of very high density along its path. Since the number of reactions of this type, per unit time, is proportional to the thermal neutron flux, the current from the chamber due to this reaction is also proportional to the thermal neutron flux.

While radiation detectors of this type may be satisfactory for some purposes, nevertheless, difficulties are encountered where it is desirable to measure a low intensity neutron flux when there is gamma ray flux present in such intensity that the ionization caused by the gamma rays is of the same, or substantially the same, intensity as the ionization caused by the neutron flux, such as in a nuclear reactor. In this circumstance, the neutron radiation is difficult to distinguish from the gamma radiation.

In order to measure the neutron flux over a wide range of instensity in the presence of a substantial gamma ray background, it is necessary to obtain a maximum neutron sensitivity and a minimum gamma ray sensitivity. With respect to neutron sensitivity, while the isotope $B^{10}$ is preferred as a neutron sensitive material as pointed out above, isotopes of other materials having a similar property may be used within the scope of this invention, such for example as an isotope of lithium. I have found that neutron sensitivity may be substantially improved by employing isotopic $B^{10}$ rather than natural boron for coating the electrodes.

The gamma ray sensitivity may be reduced considerably by restricting the volume of the chamber, since the gamma ray sensitivity is proportional to the quantity of gas in the chamber. It has been found that an optimum condition exists when the spacing of the electrodes is approximately ½ of the range of the alpha particle emitted from the $B^{10}(n,\alpha)Li^7$ reaction.

It is, accordingly, an object of my invention to provide an improved radiation detector.

It is a further object of my invention to provide an improved neutron detector.

It is still a further object of my invention to provide a neutron detector capable of measuring neutron radiation impinging thereon independently of the gamma radiation impinging thereon.

It is an ancillary object of my invention to provide a new and useful electrical apparatus.

The invention with respect to both the organization and the operation thereof, together with other objects and advantages may be best understood from the following description of a preferred embodiment thereof, when read in connection with the accompanying drawing, in which.

Figure 4:
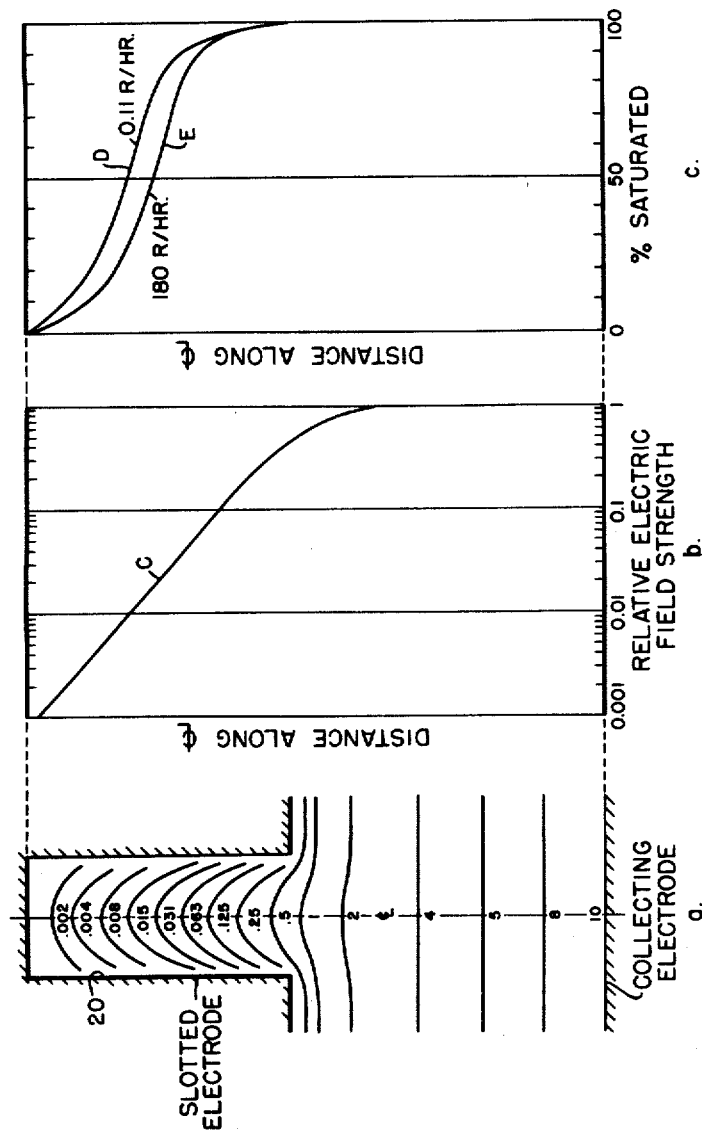
Figure 5:
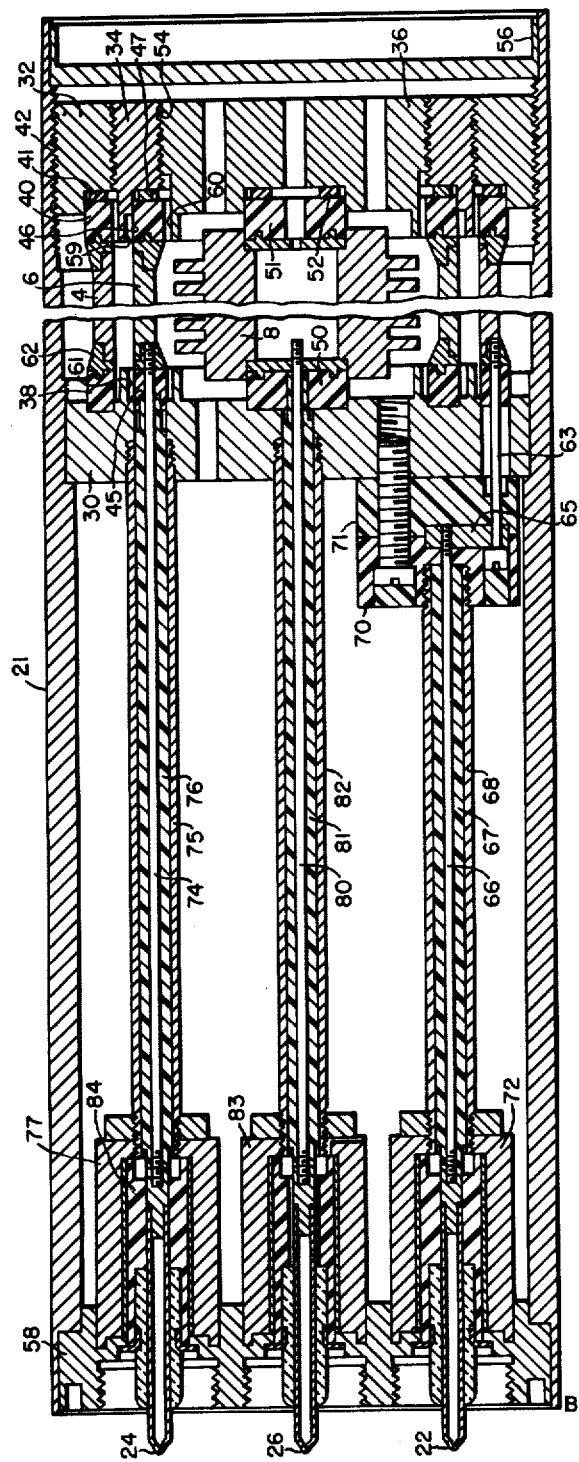

Fig. 4 illustrates, at the left, the distribution of the electric field across the outer volume at one of the grooves in the inner electrode, and curve C shows the field distribution along the center line of such a groove, while curves D and E illustrate the degree of saturation along a groove center line at different gamma ray intensities; and, Fig. 5 is a longitudinal sectional view of a radiation detector tube in accordance with my invention.

In accordance with my invention, I provide a radiation detector having an outer cylindrical electrode 4. Inside the outer cylindrical electrode 4 and spaced therefrom is a cylindrical collector electrode 6 which extends through the outer electrode 4. In the interior of the collector electrode 6, there is an inner electrode 8 which extends through the collector electrode 6 in spaced relation thereto. The inner electrode 8, the collector electrode 6, and the outer electrode 4 are electrically insulated from each other and are contained in a sealed metal casing.

The collector electrode 6 is connected through an indicator 12, which may be any suitable current responsive indicating device capable of giving an indication in response to currents of small magnitudes. A source of positive potential 14 is connected to the outer electrode 4, and a source of negative potential 16 is connected to the inner electrode 8.

The entire interior of the tube is partially evacuated and filled with a suitable gas, such as nitrogen. With reference to the optimum spacing of the walls of a neutron sensitive chamber which are coated with a neutron sensitive material, it has been pointed out that it should be about ½ the range of the emitted ionizating particle, and in the case of air or nitrogen and boron coating, this is about ⅛ of an inch. Therefore, in the preferred embodiment of my invention, the outer electrode 4 and the collector electrode 6, which form the outer neutron sensitive chamber, are separated by about ⅛ inch, and the inner surface 10 of the outer electrode 4 and the outer surface of collector electrode 6 are coated with a neutron sensitive material, illustratively with $B^{10}$.

If the three electrodes are connected so that the potential between the collector electrode 6 and the outer electrode 4 is opposite to the potential between the collector electrode 6 and the inner electrode 8, and the volumes of the inner and outer chambers are adjusted so that the ionization produced by gamma rays in the inner and outer chambers will be substantially equal, then since positive ions in the outer chamber are then equal in number to the negative ions produced in the inner chamber, the charges of these particles on contacting the collector electrode 6 will cancel each other out, and there will be no current through the indicating device 12 connected between the collector electrode 6 and ground.

It has been found that gamma flux conditions may vary considerably, for example, as found in and around reactors from point to point. The ionization produced in equal volumes by the gamma rays are seldom the same at such different points. It is, therefore, necessary after positioning the ionization chamber at a given point to adjust the compensation so that the currents due to gamma rays from the two volumes are equal. In previous designs, the compensation adjustment has been attempted mechanically by varying the size of the compensating volume. However, since the adjustment must be made after the chamber is positioned, this type of chamber must be readily accessible from outside the radiation area, and consequently requires extensive and complex mechanism.

In accordance with this invention, the compensation is accomplished electrically and hence may be readily adjusted from a remote location by simple electrical connections. In order to accomplish this, I have provided a radiation detector wherein the inner electrode 8 has a plurality of peripheral projections 18 thereon with grooves 20 in-between.

Figure 1:
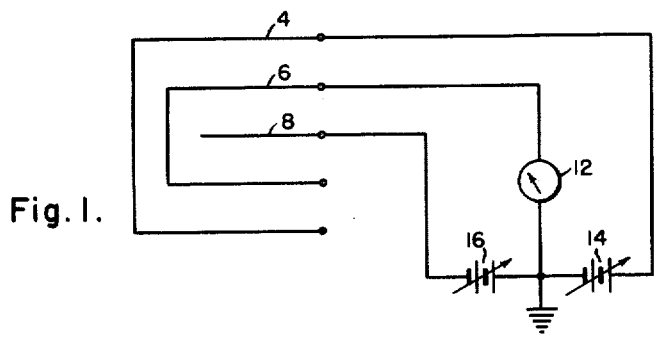
Figure 1 is a schematic showing of a radiation detector built in accordance with one embodiment of my invention.
Figure 2:
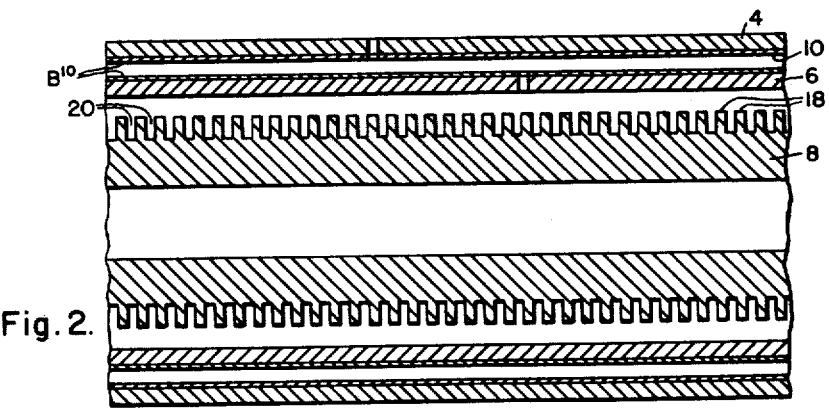
Fig. 2 is a longitudinal section of an intermediate portion of a radiation detector built in accordance with my invention.
Figure 3:
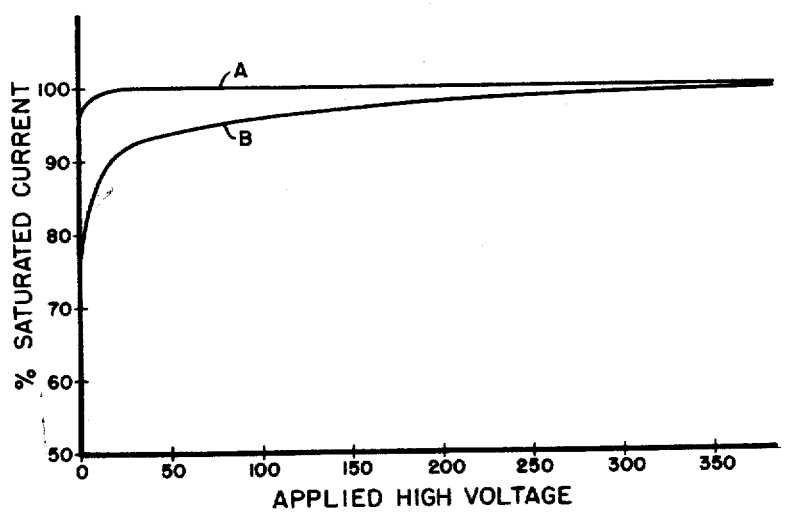
Fig. 3 is a showing in graphical form of the saturation curves of the inner and outer volumes of the radiation detector shown in Fig. 2.

In Fig. 3, I have shown the shapes of the saturation curves for the inner and outer volumes, and in Fig. 4 there is illustrated the equipotential lines of the electric field across the inner volume including one of the grooves 20, at the left. Curve C shows the distribution of the electric field down the center line of a groove 20, and curves D and E show the degree of saturation along the same center for two widely different gamma ray intensities. Because of the essentially uniform electric field which exists in the outer volume due to the smooth parallel surfaces of the walls thereof, all portions of this volume become equally saturated at a given applied voltage. Therefore, the entire outer volume becomes saturated at a relatively low applied voltage as shown by curve A (Fig. 3). However, the inner volume does not become completely saturated at the same voltage. In the case of the inner volume, the current rises sharply at low voltages due to saturation of those portions of the inner volume which are outside of the grooves 20. As the voltage is increased, the current rises at a slower rate because much higher voltages are required to saturate the regions of weaker field strength in grooves 20, as shown in Figs. 3 and 4.

Accordingly, I have provided connections for applying a variable potential between the inner and collector electrodes. The voltage applied between electrodes 4 and 6 should be sufficiently high to saturate the space between them. Adjustment of the sensitivity of the inner space to gamma radiation may then be readily made to balance that of the outer space by adjusting the voltage applied across electrodes 6 and 8. In order to do this, the inner space should be somewhat larger, on the order of 10–15%, than the outer space, since only part of the inner space will normally be saturated. The sensitivities of the two chambers to any given value of gamma flux may thus be made equal, and this adjustment can be made at any desired point remote from the radiation area, such as at a remote central control point.

In Fig. 5, I illustrate in longitudinal section details of a detector tube constructed in accordance with my invention. The outer electrode 4, collector electrode 6, and the inner electrode 8 are mounted concentrically within a metal container 21. Connections from the electrodes 4, 6, and 8 are brought out to terminals 22, 24, and 26 which are sealed in the left end of the container 21. The container 21 is partially evacuated through the terminal 26 which has an opening through its center which communicates with the interior of the container 21. The container 21 is then filled with a suitable gas, such as nitrogen, and the terminal 26 is pinched off to seal the container 21.

The electrodes 4, 6, and 8 are mounted within the container 21 by means of a metallic member 30 at one end and by means of metallic members 32, 34, and 36 at the other end.

The electrode 4 is cylindrical, and it is secured on the metal member 30 by a cylindrical insulator member 38. Another similar cylindrical insulator member 40 is provided at the other end of the electrode 4. A metal washer 41 is provided behind the insulator 40, and the cylindrical metal member 32 is screwed into the container 20 by means of the threads 42 to hold the electrode 4 rigidly in position in the container 21.

The electrode 6 is secured at one end by a cylindrical insulator 45 which is fastened to the metal member 30, and at the other end by a similar cylindrical insulator 46. A metal washer 47 is provided behind the insulator 46. The metal member 34 is screwed into the metal member 32 by means of threads to securely hold the electrode 6 in position.

The electrode 8 is secured at one end by means of an insulator 50, which is mounted in the metal member 30 and is secured at the other end by a similar insulator 51. A cylindrical metal washer 52 is provided behind the insulator 51, and a metal member 36 is screwed into the metal member 34 by means of threads 54 to hold the electrode 8 firmly in position. After the members 32, 34, and 36 have been positioned in the container 21, a header member 56 is placed in position and welded to the container. The terminal end of the container is sealed by a metal member 58 which has the terminals 22, 24, and 26 sealed therethrough.

It is seen that the metal member 34 has a skirt portion 59 which extends along one side of the insulator 46 for the electrode 6, and the metal member 36 has a similar skirt portion 60 which extends along the other side of the insulator 46 for the electrode 6. At the other end of the electrode 6, there are provided skirt portions 61 and 62 on the metal member 30 which extend along each side of the insulator 45 for the electrode 6. These skirt portions provide an electrostatic shield for the insulators 45 and 46 to prevent high electric fields from deteriorating or otherwise affecting the insulators for the electrode 6.

The electrode 4 is connected to the terminal 22 by means of a screw 63, a link member 65, and a conductor 66. The conductor 66 is surrounded by insulating material 67. The insulating material 67 is surrounded by an electrostatic shield 68. The shield 68 is mechanically supported from the casing 21 through the insulating members 70 and 71, and member 30 at the end nearest the electrode 4 and is connected directly to the casing 21 through the metal members 72 and 58 at the terminal end of the casing 21.

The electrode 6 is connected to the terminal 24 through a conductor 74. The conductor 74 is surrounded by insulating material 76. The insulating material 76 is surrounded by an electrostatic shield 75. The electrostatic shield 75 is connected directly to the casing 21 through the metal member 30 at the end nearest the electrode 6 and is connected to the container 21 at the terminal end through metallic members 77 and 58.

The electrode 8 is connected to the terminal 26 by a conductor 80. The conductor 80 is surrounded by insulating material 81. The insulating material 81 is surrounded by an electrostatic shield 82. The electrostatic shield 82 is connected directly to the container 21 through the metal member 30 at the end nearest the electrode 8, and is connected to the container 21 at the end nearest the terminal 26 through metallic members 83 and 58.

It is desirable that the conductors 66, 74, and 80 be relatively long in order to get the terminals 22, 24, and 26 away from the sensitive volumes between electrodes 4, 6, and 8, so as to lessen the effect of neutron induced radioactivity in the materials of which terminals 22, 24, and 26 are constructed. If the terminals 22, 24 and 26 are not remote from the sensitive volumes, neutron induced activities in the materials of the terminals 22, 24, and 26 will cause a false or ambiguous indication to be obtained. In my invention, the possibility of picking up such an ambiguous indication is substantially decreased by making the conductors 66, 74, and 80 relatively long to remove possible sources of neutron induced activity from proximity to the sensitive volumes.

The volume of container 21 from which ionization can be collected and delivered to terminal 24 is restricted to the spaces between electrodes 4, 6, and 8. This is accomplished by isolating the conductor 74 and its terminal 24 from the gas filling the container 21 by means of the insulation 76 and 84, as well as by the electrostatic shields 75 and 77. Similar provision is made for the conductors 66 and 80 and their terminals primarily to provide a similar arrangement for mechanically supporting these elements. The insulation employed should be one capable of retaining its insulating qualities in the presence of radiations over a long period of time, such for example as quartz or polystyrene.

The metal members described hereinbefore are preferably of a material having low neutron induced activities, such as magnesium.

The necessary potentials for operating the detector tube illustrated above can be applied to the terminals 22, 24, and 26 in any suitable manner.

It has been found that a detector constructed in accordance with this invention provides gamma compensation to approximately 1% over long periods of time. There is also provided a radiation detector which is capable of detecting neutrons in the presence of a gamma ray background which may produce as much as a hundred times the ionization due to the neutron flux.

While I have described the device herein as comprising electrodes having a cylindrical shape, nevertheless, it is understood that other shapes may be employed. For example, planar or flat electrodes may be used, or they may take various other shapes.

Although I have shown and described a specific embodiment of my invention, I am aware that other modifications thereof are possible. My invention, therefore, is not to be restricted except insofar as is necessitated by the prior art and the spirit of the invention.

I claim as my invention:

1. An electrically adjustable neutron detector comprising, a pair of adjacent ionization chambers each having spaced electrodes and an ionizable medium filling the space between the electrodes, one of said chambers including neutron sensitive means for producing ionizing particles and having its electrodes substantially uniformly spaced throughout the chamber so as to be uniformly saturable at a predetermined voltage applied to its electrodes, means for applying such predetermined voltage to the electrodes of said one chamber, the other of said chambers having its electrodes non-uniformly spaced so that the degree of saturation of said second chamber varies over a relatively wide range of voltages applied to its electrodes, means for applying a voltage to the electrodes of said second chamber including means for varying the applied voltage, one electrode of each chamber being of opposite polarity and the other electrodes having a common connection to a return circuit having current responsive indicating means therein.

2. An electrically adjustable neutron detector comprising, three spaced electrodes forming a pair of ionization chambers therebetween, an ionizable medium filling the space between the electrodes, one of said chambers including neutron sensitive means for producing ionizing particles and having its electrodes substantially uniformly spaced throughout the chamber so as to be uniformly saturable at a predetermined voltage applied to its electrodes, means for applying such predetermined voltage to the electrodes of said one chamber, the other of said chambers having its electrodes non-uniformly spaced so that the degree of saturation of said second chamber varies over a relatively wide range of voltages applied to its electrodes, means for applying a voltage to the electrodes of said second chamber including means for varying the applied voltage, a circuit including current responsive indicating means connected to the electrode which is common to said chambers, and the voltages applied to the other electrodes of each chamber being of opposite potential.

3. In combination: an inner tubular electrode, a middle tubular electrode, and an outer tubular electrode arranged concentrically, an ionizable gas in the region between said inner electrode and said middle electrode and the region between said middle electrode and said outer electrode, said inner electrode having its surface toward said middle electrode different in form from the facing surface of the middle electrode, the outer surface of said middle electrode and the inner surface of said outer electrode being smooth and being coated with a material sensitive to neutrons to emit a charged particle, connections for applying a direct current potential between said outer electrode and said inner electrode, and current responsive apparatus connected to said middle electrode.

4. In combination: an inner electrode, a middle tubular electrode and an outer tubular electrode arranged concentrically, the outer surface of said inner electrode, the two surfaces of said middle electrode and the inner surface of said outer electrode being substantially equidistant from each other at all points over their surfaces, said inner electrode having its outer surface marked with indentations, and the inner surface of said outer conductor and the outer surface of said middle conductor being coated with a neutron sensitive material.

5. In combination: a first hollow chamber having walls of electrically conducting material, a second hollow chamber adjacent said first chamber and having walls of electrically conducting material, a wall of said first chamber having a plurality of closely spaced projections thereon, a wall of said second chamber having a neutron sensitive coating in the interior thereof, means for applying opposite potentials to one wall of each chamber, respectively, a common connection to the other walls of said chambers including indicating means.

6. In combination: a first hollow chamber having walls of electrically conducting material, a second hollow chamber adjacent said first chamber and having walls of electrically conducting material, a wall of said first chamber having a plurality of closely spaced projections thereon, a wall of said second chamber having a neutron sensitive coating in the interior thereof, said projections being separated by a distance between a tenth and twice the thickness of said first hollow chamber, and one wall of each chamber being at the same electrical potential.

7. In combination: a first hollow chamber having opposed walls of electrically conducting material, a second hollow chamber adjacent said first chamber and having opposed walls of electrically conducting material, a wall of said first chamber having a plurality of closely spaced recesses therein, a wall of said second chamber having a neutron sensitive coating in the interior thereof, said first chamber and said second chamber having their aforesaid walls spaced apart a distance on the order of ½ the range of the particle emitted from the neutron sensitive material, and one wall of each chamber being at the same electrical potential.

8. A detector tube comprising a container containing a gas, a first electrode in said container, a neutron sensitive material on said first electrode, a second electrode spaced from said first electrode, a neutron sensitive material on said second electrode, the neutron sensitive material of said second electrode being adjacent the neutron sensitive material of said first electrode, a third electrode adjacent said second electrode, a wall of said third electrode nearest said second electrode having a plurality of projections thereon, and terminals for applying potentials to said electrodes.

9. A detector tube comprising a container containing a gas, a first electrode in said container, a neutron sensitive material on said first electrode, a second electrode spaced from said first electrode, a neutron sensitive material on said second electrode, the neutron sensitive material of said second electrode being adjacent the neutron sensitive material of said first electrode, a third electrode adjacent said second electrode, a wall of said third electrode nearest said second electrode having a plurality of projections thereon, terminals connecting to the interior of said container, and conductors connecting said electrodes to said terminals.

10. A detector tube comprising a container containing a gas, a first electrode in said container, a neutron sensitive material on said first electrode, a second electrode spaced from said first electrode, a neutron sensitive material on said second electrode, the neutron sensitive material of said second electrode being adjacent the neutron sensitive material of said first electrode, a third electrode adjacent said second electrode, a wall of said third electrode nearest said second electrode having a plurality of projections thereon, terminals connecting to the interior of said container, conductors in said container connecting said electrodes to said terminals, and means for insulating said conductors from said container and from the gas contained therein.

11. A detector tube comprising a container containing a gas, a first electrode in said container, a neutron sensitive material on said first electrode, a second electrode spaced from said first electrode, a neutron sensitive material on said second electrode, the neutron sensitive material of said second electrode being adjacent the neutron sensitive material of said first electrode, a third electrode adjacent said second electrode, a wall of said third electrode nearest said second electrode having a plurality of projections thereon, terminals connecting to the interior of said container, conductors connecting said electrodes to said terminals, means including insulators, and electrostatic shields for isolating said conductors from said container and from ionization in said container.

12. An electrically adjustable neutron detector comprising, a pair of adjacent ionization chambers each having spaced electrodes and an ionizable medium filling the space between the electrodes, one of said chambers including neutron sensitive means for producing ionizing particles, means for applying a voltage to the electrodes of said one chamber for completely saturating said one chamber, means for applying a variable voltage to the electrodes of said second chamber, said second chamber having a non-uniform spacing of its electrodes for varying the degree of saturation of said second chamber over a relatively wide range of applied voltage, one electrode of each chamber being of opposite polarity and the other electrodes having a common connection to a return circuit having current responsive indicating means therein.

13. An electrically adjustable neutron detector comprising, a pair of adjacent ionization chambers each having spaced electrodes and an ionizable medium filling the space between the electrodes, one of said chambers including neutron sensitive means for producing ionizing particles and having its electrodes substantially uniformly spaced throughout the chamber so as to be uniformly saturable at a predetermined voltage applied to its electrodes, means for applying such predetermined voltage to the electrodes of said one chamber, the other of said chambers having its electrodes non-uniformly spaced and enclosing a volume greater than the enclosed volume of said one chamber so that the degree of saturation of said second chamber varies over a relatively wide range of voltages applied to its electrodes, means for applying a voltage to the electrodes of said second chamber including means for varying the applied voltage, one electrode of each chamber being of opposite polarity and the other electrodes having a common connection to a return circuit having current responsive indicating means therein.

14. An electrically adjustable neutron detector comprising, a pair of adjacent ionization chambers each having spaced electrodes and an ionizable medium filling the space between the electrodes, one of said chambers including neutron sensitive means for producing ionizing particles and having its electrodes substantially uniformly spaced throughout the chamber so as to be uniformly saturable at a predetermined voltage applied to its electrodes, means for applying such predetermined voltage to the electrodes of said one chamber, the other of said chambers having one of its electrodes formed with a plurality of spaced projections on its surface facing the other electrode so that the degree of saturation of said second chamber varies over a relatively wide range of voltages applied to its electrodes, means for applying a voltage to the electrodes of said second chamber including means for varying the applied voltage, one electrode of each chamber being of opposite polarity and the other electrodes having a common connection to a return circuit having current responsive indicating means therein.

15. An electrically adjustable neutron detector comprising, a pair of adjacent ionization chambers each having spaced electrodes and an ionizable medium filling the space between the electrodes, one of said chambers including neutron sensitive means for producing ionizing particles and having its electrodes substantially uniformly spaced throughout the chamber so as to be uniformly saturable at a predetermined voltage applied to its electrodes, means for applying such predetermined voltage to the electrodes of said one chamber, the other of said chambers having one of its electrodes formed with a plurality of spaced projections on its surface facing the other electrode and said other chamber enclosing a volume including the space between said projections which is greater than the enclosed volume of said one chamber so that the degree of saturation of said second chamber varies over a relatively wide range of voltages applied to its electrodes, means for applying a voltage to the electrodes of said second chamber including means for varying the applied voltage, one electrode of each chamber being of opposite polarity and the other electrodes having a common connection to a return circuit having current responsive indicating means therein.

16. An electrically adjustable neutron detector comprising, a pair of adjacent ionization chambers each having spaced electrodes and an ionizable medium filling the space between the electrodes, one of said chambers including neutron sensitive means for producing ionizing particles and having its electrodes substantially uniformly spaced throughout the chamber to form an ionization chamber of substantial extent but having a uniformly relatively small thickness which is uniformly saturable at a predetermined voltage applied to its electrodes, means for applying such predetermined voltage to the electrodes of said one chamber, the other of said chambers having similarly spaced electrodes to provide a similar space which is uniformly saturable at a predetermined voltage but one electrode of said other chamber having a plurality of spaced relatively narrow grooves in its surface facing the other electrode to provide spaces in said grooves the degree of saturation of which varies over a wide range of voltages including the predetermined voltage of said other chamber and above so that the degree of saturation of said second chamber varies over a relatively wide range of voltages applied to its electrodes, means for applying a voltage to the electrodes of said second chamber including means for varying the applied voltage, one electrode of each chamber being of opposite polarity and the other electrodes having a common connection to a return circuit having current responsive indicating means therein.

References Cited in the file of this patent

UNITED STATES PATENTS

| | | |
|---|---|---|
| 2,440,167 | Broxon et al. | Apr. 20, 1948 |
| 2,481,506 | Gamertsfelder | Sept. 13, 1949 |
| 2,481,964 | Wollan | Sept. 13, 1949 |
| 2,491,220 | Segre et al. | Dec. 13, 1949 |
| 2,506,419 | Graves | May 2, 1950 |
| 2,531,804 | Carlin et al. | Nov. 28, 1950 |
| 2,532,874 | Anderson | Dec. 5, 1950 |
| 2,643,343 | Rainwater | June 23, 1953 |